(12) United States Patent
Zhang

(10) Patent No.: US 9,606,809 B2
(45) Date of Patent: Mar. 28, 2017

(54) COMPUTER WITH FLEXIBLE OPERATING SYSTEM

(71) Applicant: Yin Sheng Zhang, Richmond (CA)

(72) Inventor: Yin Sheng Zhang, Richmond (CA)

(73) Assignee: Yin Sheng Zhang (CA)

( * ) Notice: Subject to any disclaimer, the term of this patent is extended or adjusted under 35 U.S.C. 154(b) by 220 days.

(21) Appl. No.: 14/352,319

(22) PCT Filed: Mar. 15, 2013

(86) PCT No.: PCT/IB2013/052102
§ 371 (c)(1),
(2) Date: Apr. 17, 2014

(87) PCT Pub. No.: WO2013/144767
PCT Pub. Date: Oct. 3, 2013

(65) Prior Publication Data
US 2015/0113259 A1    Apr. 23, 2015

(30) Foreign Application Priority Data
Mar. 27, 2012    (CA) ..................................... 2773095

(51) Int. Cl.
*G06F 9/44*    (2006.01)
(52) U.S. Cl.
CPC ............ *G06F 9/4401* (2013.01); *G06F 9/441* (2013.01)
(58) Field of Classification Search
CPC ..................................................... G06F 9/4401
See application file for complete search history.

(56) References Cited

U.S. PATENT DOCUMENTS

| | | | |
|---|---|---|---|
| 2007/0260868 A1* | 11/2007 | Azzarello | G06F 9/4406 713/2 |
| 2009/0019276 A1* | 1/2009 | Song | H04L 67/34 713/2 |

* cited by examiner

*Primary Examiner* — Paul Yanchus, III
*Assistant Examiner* — Joshua Neveln

(57) ABSTRACT

Computer with flexible operating system, referred to the FOS Computer, it is an invention of the electronic information field, aimed at creating a unique mechanism to run the computer.

Figure 1:
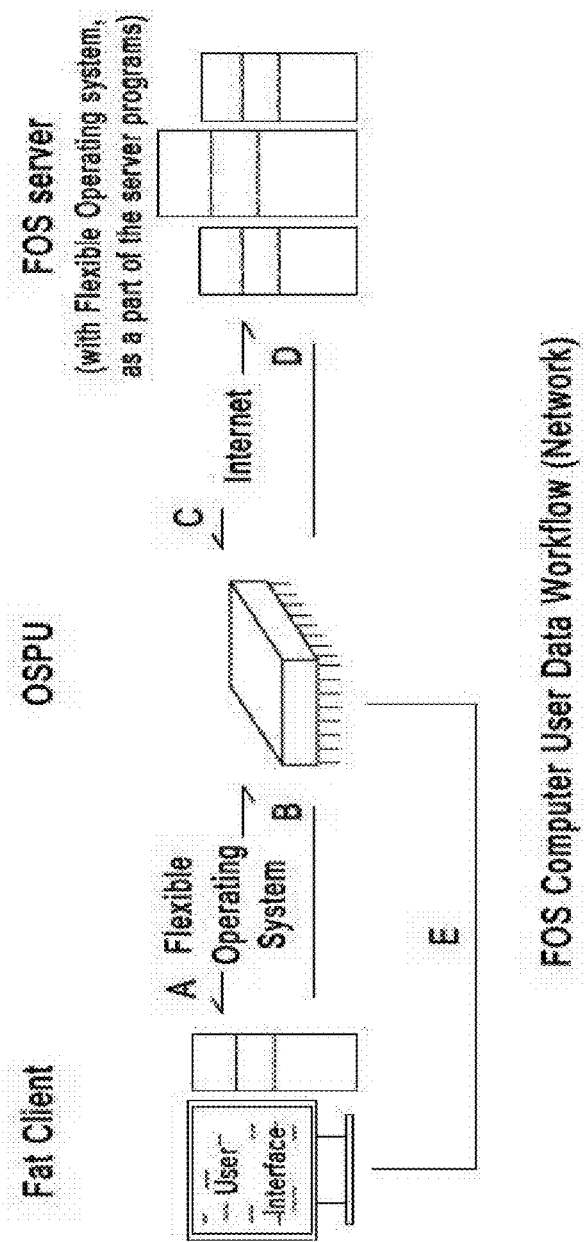

The FOS Computer abandons the graphical interface operating system that usually were fixed installed on the client computer, and replaced it with Flexible OS.

The invention utilizes the sharing advantages of remote server, and an innovative computer hardware, jointly establishes a unique computer operational process. This process makes the computer more powerful, the application more flexible, the operation more secure and reliable.

The key composition of the FOS Computer:
   A. Remote server based operating system, referred to as Server based OS
   B. Operating System Processing Unit, referred to as OSPU
   C. OSPU operating system, referred to as OSPU-OS.

Among them, OSPU is an innovative computer component. OSPU is also the core hardware of the present invention. OSPU does not just exchanging data between the network server and client computers, but it also provides security feature, and acts as the user identification ID in FOS Computer.

Server based OS and OSPU-OS working together to form a complete operating system, which is Flexible operating system of FOS computer.

25 Claims, 5 Drawing Sheets

A. To Memory

B. To Encrypt User Data

C. Encrypt Data, then To Decrypt

D. To Decrypt User Data, then Store

E. Client's Hardware and OSPU Working Together to Process Data

A. Flexible Operating System Data to Memory

B. To Encrypt User Booting Request

C. Encrypt Flexible Operating System Data, then To Decrypt

D. To Decrypt User Request, then Process

E. Client's Hardware and OSPU Working Together to Process Data

F. Decrypt User Request, then load Basic FOS to Memory

A. To Login
B. To Encrypt User Login Request
C. Encrypt User Data, then To Decrypt
D. To Decrypt User Request, then Confirm
E. Client's Hardware and OSPU Working Together to Process Data Flexible Operating System Startup Flowchart

Figure4

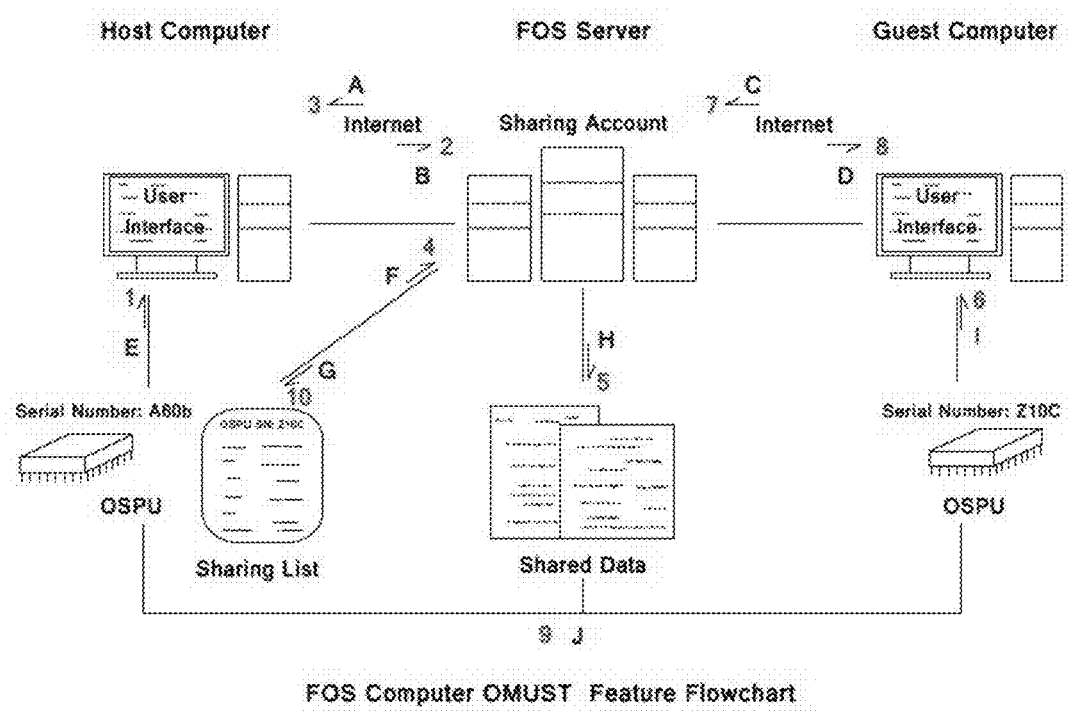

FOS Computer OMUST Feature Flowchart

| | | | |
|---|---|---|---|
| A. | Authorize the OSPU with the SN. a host to the Sharing Account | B. | Send request that making the OSPU with the SN. a host to the Sharing Account |
| C. | Send OSPU SN. | D. | Send invitation to the computer that its OSPU SN. is in the Sharing List |
| E. | Collect OSPU SN. | F. | Collect OSPU SN. from the List |
| G. | Keep Looking for updates in the List | H. | Set Privileges |
| I. | Collect OSPU SN. | J. | Using the account at the Same Time |

Figure5

Comparison chart of some similar technology

| | FOS Computer | Computer Terminal | Google Chrome | Cloud Computing |
|---|---|---|---|---|
| Pre-installed user-end OS Required | ✗ | ✓ | ✓ | ✓ |
| Working with Local Hardware Directly | ✓ | ✓ | ✗ | ✗ |
| Operating through Web Browser | ✗ | ✓ | ✓ | ✗ |
| Connecting Network before user-end OS boots | ✓ | ✗ | ✓ | ✗ |
| Working with OSPU (Operating System Processing Unit) | ✓ | ✗ | ✗ | ✗ |
| Specific Application Software Required for OS running | ✗ | ✓ | ✓ | ✓ |
| OMUST with OSPU Feature | ✓ | ✗ | ✗ | ✗ |
| Extended FOS is Part of Flexible OS | ✓ | ✗ | ✗ | ✗ |

COMPUTER WITH FLEXIBLE OPERATING SYSTEM

CHAPTER 1: TECHNICAL FIELD

Computer with flexible operating system, referred to FOS Computer, which is an invention that belongs to the field of electronic information technology, the FOS thereof is abbreviation of flexible operating system. FOS Computer re-built computer operating process and system architecture, which aim at creating a unique mechanism operating on fat client.

FOS Computer abandons traditional graphical interface operating system that is usually permanently installed on fat client, and replaced with flexible operating system.

Present invention utilizes server advantages of resource sharing and fat client advantage of user autonomy, to establish a unique computer operating process. This process makes computer more powerful, application more flexible, operating more secure and reliable.

The main component of computer with flexible operating system comprises:

A. Base portion of flexible operating system, which is installed in OSPU of client fat, so it is also referred to OSPU-OS in the abstract of this description.

B. Operating system processing unit, which is referred to OSPU.

C. Extended portion of flexible operating system, which is downloaded from FOS server to fat client, so it is also referred to Server based OS in the abstract of this description.

Among them, OSPU is the core hardware placed on fat client of this invention. OSPU not only act as channel of exchanging data between FOS server and fat client, but also protect security of data transmission. More importantly, OSPU is a settle platform of base portion of FOS and a regulatory center of entire flexible operating system, it lead to birth of FOS Computer.

The base portion of FOS and the extended portion of FOS will be working together to form a complete operating system on fat client, which is flexible operating system in FOS Computer.

CHAPTER 2: BACKGROUND ART

Modern computer has undergone several radical technology innovations, which mainly focused on enhancing of performance of hardware, and hardware innovation has always been the behind motivation of computer operating system development.

Today, however, with gradually mature of network technology, new generation computer has turned to extensive use of function of remote server, rather than just focus on hardware configuration, and most recent computer innovation news is gathered in network technology applied in computer.

There are several techniques have been widely used currently, and here to be used as comparison with FOS computer.

1. Network Terminal Operated by Downloadable Operating System

This is the concept mentioned in a United States patent document, the document name is 'Network terminal operated by downloadable operating system and operating method thereof', here referred to as D1.

The biggest difference between "Network terminal operated by downloadable operating system" and FOS computer is: network terminal run on the basis of thin client, but FOS Computer run on the basis of fat client, and FOS Computer never run on thin client.

FOS is a semi-network source operating system, because the base portion of FOS is saved in OSPU of fat client, which is different from downloadable OS.

The extended portion of FOS is stored in FOS server, but it must be combined with the base portion of FOS in fat client, then to be functioning, so it is not a complete operating system, neither running on thin client, nor independent running on fat client, from this perspective, it is also different from downloadable OS.

In contrast, downloadable OS is a complete operating system, and entirely a network source operating system, and it lacks the flexibility of computer models selection, and lacks the flexibility of system file download adjusting:

(1). Downloadable OS is the only terminal operating system that supports data transmission, if it is not downloaded from server to terminal, the terminal will not be able to run.

(2) Downloadable OS can merely be downloaded to the terminal which using the same operating system to run, it cannot run on other types of computer.

(3) Document D1 did not mention that downloadable OS system files can be adjusted download according to the user needs.

Terminal does not directly compute and generate user data, computing and data generating are all on server (host computer).

Downloadable OS's main function is to transmit user commands and download server computing results (image data), and display image data on terminal.

Therefore, downloadable OS can not afford to support user data to be computed and generated on client computer, which leads to a problem that it is difficult to widen its application field.

Although D1 mentioned application of terminal in WAN, but in WAN environment, the server will face countless thin clients, and how it take on this huge burden of user data computing under the premise of quality and quantity, which is no answer in D1.

FOS is semi-network source operating system, it supports local computing of fat client, rather than relying on server computing, and which overcomes the difficulties and shortcomings of downloadable OS.

In addition, FOS supports computer basic operation in the case of network disconnected, and reduces the impact of networking fluctuation in the case of network connected.

FOS is applicable to any type and model of fat client, regardless of what operating system the fat client original is carried, cross-platform operating and flexible function is the greatest feature of FOS.

The system files of FOS downloaded from server is adjustable according to current operating needs of fat client, or may be downloaded zero.

2. Cloud Computing

Existing methods of cloud computing have to use special application to operate, and have to rely on traditional computer graphic interface operating system.

Conversely, the operating system of FOS Computer is graphical interface operating system, it is not application.

Some of cloud computing method also used the name of online operation system (OOS), or network operating system, but in essence they are still considered to be application.

The safety performance of cloud computing need to be supported by fat client's graphical interface operating system, which result in repeated identification and other tedious system anti-hazard operation.

In contrast, FOS computer use OSPU as safeguard of data transmission, local hard drive is no longer carrier of graphical interface operating system, network activity is no longer dependent on application, which eliminates many security-related operation.

Login, login, and login again, in the case of internet fraud epidemic, which would scare off a lot of ordinary users whose computer skills are not strong enough.

Cloud computing relies on application, which means it lacks support of operating system on fat client. Application alone can not be well combined with local graphical operating system, so complicated operation is only way of cloud computing to protect security.

In contrast, the graphic interface operating system of FOS Computer can well co-operate with hardware on fat client, it also configure system files with OSPU.

OSPU hardware identification code added in data and system anti-hazard mechanism, which make it easier to get rid of tedious and excessive security operation.

3. Thin Client.

The thin client has the ability to operate as its host, but it is totally dependent on its host's resource. CPU, random access memory and other system resources are limited, which is bound to have sharing ceiling. Further, if a thin client require high system resource occupancy rate, other users are affected.

In this regard, FOS Computer realizes the separation of operating system and host computer (server), which breaks through the sharing barrier.

The main difference between the two:

(1) In thin client technology, graphical interface operating system only loads and run on host.

Thin client rely on host to complete operation, it is only the platform of data transfer and display window of host computing result, so it is not necessary to load graphical interface operating system separately, even loading, that is an incomplete one.

In contrast, the operating systems of FOS Computer are from FOS server and OSPU, which is loaded into fat client's random access memory. Fat client run full a functional graphical interface operating system.

(2) Thin client does not have hardware foundation of computing and generating user data.

Thin client can not share data computing task for host, its number increases, host burden synchronization increase, but host capacity exist up-limit.

In contrast, FOS computer with hardware foundation of data local computing and generating, its flexible operating system support hardware of fat client computing data independently, OSPU then transmit computing result to server.

It relieves pressure on server, which makes server unlimitedly extend the scope of service.

(3) OSPU do not apply to thin client, flexible operating system do not operate on thin client, because there is no hardware foundation of user data computing and generating in thin client.

4. Remote Access Software

Computer access and control another computer through remote access software, which usually uses TCP protocol.

The advantage of using TCP protocol is stable and a high connection success rate.

The disadvantage is that both sides must have public IP (or in internal network), otherwise user needs to do port mapping on router.

This means that users can only control a computer with public IP, or can only control the computer within internal network, such as control of other computers in same company.

In contrast, the flexible operating system is not an ordinary application, but the real graphical interface operating system. It is open to general user of WAN, and it does not use TCP protocol, application goes beyond various network boundaries.

In addition, remote access software is very similar to Trojan virus, which always makes trouble in fat client.

5. Google's Chrome OS

Chrome OS installed on flash drive, or virtual machine software.

It is Linux-based open source web operating system, when it is used, computer need only a chrome browser, most of program and data are handled on network server.

In fact, chrome OS is just super web browser.

In addition to save small amount of personal information, such as web login password, browser does not save any other data.

Its data storage service is completed by cloud computing.

(1) Chrome operating system is not operating system in traditional sense, as cloud computing, it must run on graphical interface operating system of fat client.

In contrast, the graphical interface operating system of FOS computer does not need another operating system to maintain its operation.

(2) Chrome OS can not leave specific application, or get rid of google's specialized computer.

In contrast, FOS Computer can borrow a variety of computers as platform to run as long as there is OSPU.

(3) Chrome OS is a web browser, while flexible operating system of FOS computer is graphical user interface operating system of fat client.

(4) For server security consideration, chrome OS prohibit user from uploading user-supplied application to google web server.

In contrast, there is no security concern in this regard for FOS Computer, as long as user-supplied application gets through hazard inspection of OSPU, it is freely uploaded to FOS server and asks serve for granting of security code, and then it is freely downloaded to fat client for operating.

(5) Most of functionality of chrome OS is completed by cloud computing.

In contrast, FOS Computer exercises all computing function on fat client.

In short, FOS Computer meets the main direction of computer reform and innovation, be able to solve practical problems of user concern, and has technical feasibility.

CHAPTER 3: BRIEF DESCRIPTION OF DRAWING

FIG. 1: FOS Computer User Data Workflow
FIG. 2: Flexible Operating System Start-up Flowchart
FIG. 3: Private account of FOS Computer login Flowchart
FIG. 4: FOS Computer's OMUST Feature Flowchart
FIG. 5: Comparison chart of similar technology
1. Brief Description of Drawing of FIG. 1
FIG. 1: FOS Computer User Data Workflow
In FIG. 1, the data sending from fat client to FOS server through internet is always encrypting by OSPU.

Once the data is received by FOS server, FOS server will decrypt the data first, then to process.

The data of processing result will be sent to the fat client after encrypted by FOS server.

Once the data is received by fat client, OSPU decrypt the data, and then fat client process the data.

2. Brief Description of Drawing of FIG. 2

Figure 2:
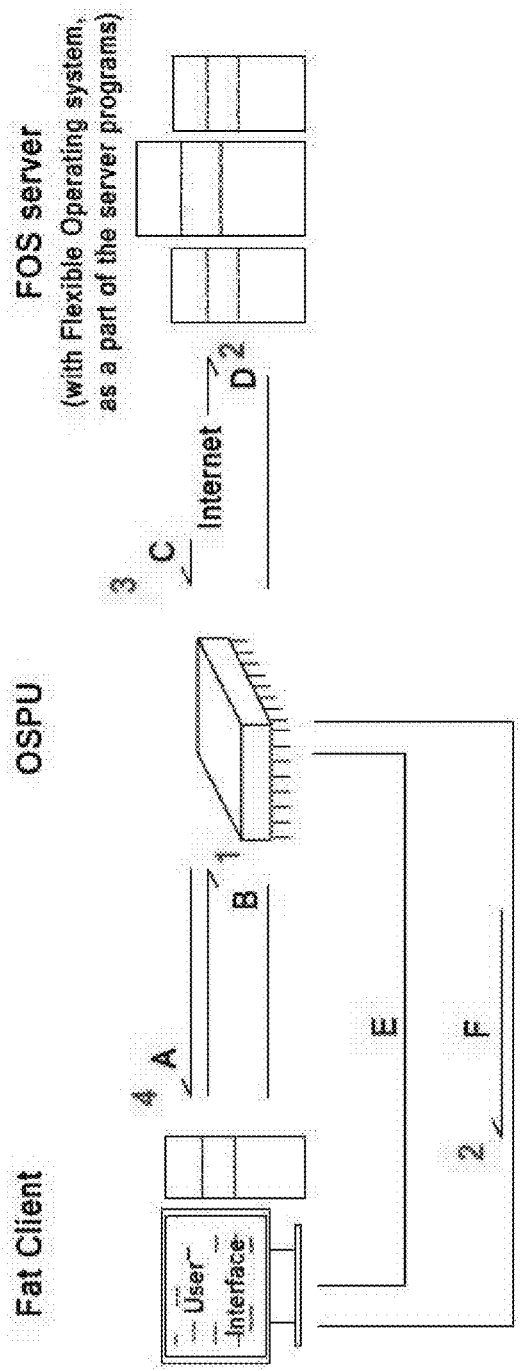

FIG. 2: Flexible Operating System start-up Flowchart

In FIG. 2, OSPU encrypts the user start-up request data, and then OSPU send the user request to FOS Server.

At the same time, OSPU loads the base portion of FOS to random access memory on fat client.

Once the user start-up request is received by FOS server, FOS server will decrypt the user start-up request, and analyze the hardware information of fat client that sent from OSPU.

Then, FOS server chooses appropriate system files of extended portion of FOS, encrypted the system files, and sending them to fat client.

Once the system files are received by fat client, OSPU will decrypt them first, and then guide them to random access memory on fat client.

The base portion of FOS from OSPU and the extended portion of FOS from FOS server combine in random access memory of fat client to form the complete flexible operating system.

3. Brief Description of Drawing of FIG. 3

Figure 3:
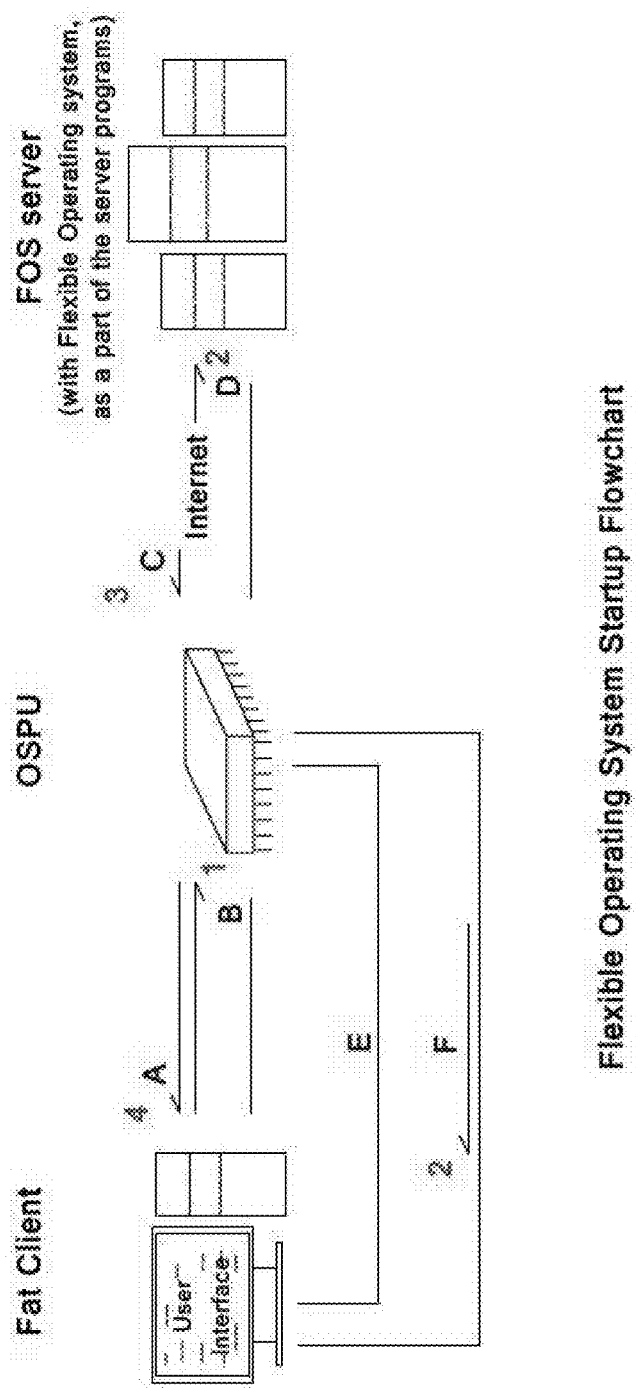

FIG. 3: Private account of FOS Computer login Flowchart

In FIG. 3, OSPU encrypts the user account login request data, and then OSPU send the user request, along with the OSPU hardware identification code to FOS server.

Once the user account login request is received by FOS server, FOS server will decrypt the user request, and then confirm user identity information.

After the user identity information to be verified, FOS server will encrypt the user account data, and then send user account data to fat client.

Once the data is received by OSPU, OSPU will decrypt the data, and then send the data to random access memory of fat client for processing.

4. Brief Description of Drawing of FIG. 4

FIG. 4: FOS Computer's OMUST Feature Flowchart

In FIG. 4, each of OSPU has its own unique serial number (SN). FOS server collects the OSPU SN that directly associated to the sharing account, and set the OSPU with this SN as the master device of OMUST function.

The sharing list in OMUST function only can be edited by the owner of the sharing account.

Whichever OSPU SN added to the Sharing List, the OSPU with those OSPU SNs becomes the auxiliary device of sharing account, and the owners of those OSPUs will have the access to the sharing account.

In sharing list of OMUST function, the main user of account set up sharing scope of account content, and set up additional sharing restriction of account for each individual auxiliary OSPU.

5. Brief Description of Drawing of FIG. 5

FIG. 5: Comparison chart of similar technology

See chart.

CHAPTER 4: DISCLOSURE OF THE INVENTION

1 Computer with Flexible Operating System

Computer with flexible operating system include new computer architecture and computer flexible operating process.

The technical feature of new computer architecture comprising:

(1) Flexible perating system. Flexible perating system is a semi-network source computer operating system, consists of two portions of extended portion and a base portion. The system files of extended portion are from FOS server, the system files of base portion are permanently saved in a mobile chip appliance of fat client.

(2) OSPU. OSPU is the abbreviation of operating system processing unit, which guide the extended portion of FOS loading and store the base portion of FOS, and support the system files of two portions of FOS to be combined together and operating together in Random Access Memory of fat client.

OSPU configure optional activating process. OSPU users set up their own user name and password for OSPU, OSPU with user name and password to startup OSPU function of system file download, but the record of user name and password is saved on server, verification process is completed on server. This process is optional, and users can choose to give up.

OSPU is used to process flexible operating system and integrate network connection feature.

OSPU is used to integrate the system files of base portion of FOS, OSPU is used to integrate computer readable medium of anti-virus, anti-hack, anti-phishing, anti-intrusion to server, anti-illegal-modification of OSPU internal data, OSPU is used to save system-predetermined data.

(3) OSPU is used for network activity, and form OSPU related network process. Wherein, OSPU hardware identification code acts as key and secret login information of network account, and it is used to replace fat client's IP code.

2 Flexible Startup Process of FOS Computer

In computer with flexible operating system, flexible startup process is an integral part of flexible operating process. The graphical interface OS in FOS Computer is semi-networked, which are bound to change computer startup steps.

The step 1, FOS computer start OSPU on fat client, and through OSPU network connector to connect FOS server.

The step 2, system files of extended portion of FOS are downloaded by OSPU from FOS server to local Random Access Memory.

Extended portion of FOS is stored in FOS server, and its system files will to be downloaded in accordance with client need.

Here, server IP has been permanently embedded in OSPU chipset, so OSPU can only connect specified server, and from there get system files of extended portion of FOS and application data.

FOS Computer startup is divided into three cases:

(1) There is only one OSPU in fat client, and there is no other graphical interface OS in fat client.

In this case, OSPU will first release base hardware supporting files of Flexible OS to Random Access Memory of fat client.

Then, OSPU actively connect FOS server to request for downloading system files of extended portion of FOS to Random Access Memory of fat client.

(2). Fat client is already installed other graphical interface OS in hard drive, but user want to use OSPU.

In this case, after computer is turned on, system will prompt user to select from which system carried device to start up.

If user selects OSPU external plug-in device, OSPU will first release local hardware supporting files of FOS to local Random Access Memory.

Then, OSPU actively connect FOS server to request for downloading system files of extended portion of FOS to Random Access Memory of fat client.

In addition, once user selects OSPU external plug-in device, original permanent graphical interface OS of fat client loss system support and no longer work.

After removing OSPU external plug-in device, computer is restored to original hard drive based operating system.

(3). There are multiple OSPUs to be used on one fat client, and no other graphical interface OS on fat client.

In this case, system will prompt user to select from which OSPU to start up.

Startup menu will present OSPU serial number, so the user is easy to make choice.

3 The Flexible Operating System

The technical feature of operating process of flexible operating system comprising:

(1) System files of operating system are divided into two portions, namely base portion and extended portion, the system files of base portion integrated in OSPU chipset of fat client, the system files of extended portion downloaded from FOS server.

(2) The prerequisite of extended portion functioning is extended portion to be combined with base portion to form a complete flexible operating system; extended portion does not alone perform its function (3) Flexible operating system operates on fat client, which supports local data processing, local computing, and local user data generation.

(4) Flexible operating system contains configuration files of user account and user interface, wherein user account is subdivided into: A. Public Account. The account configuration files of public account belong to base portion of flexible operating system, which stored on OSPU; B. Private Account. The account configuration file of private account belongs to extended portion of operating system, which stored on FOS server.

(5) Flexible operating system supports flexible user data storage process.

(6) Flexible operating system does not run directly on thin client. Flexible operating system only runs on fat client.

4 The Flexible Feature of Flexible Operating System

The flexible feature of flexible operating system mainly determined by extended portion of FOS, flexible features of FOS comprising:

(1) Flexible System File Package.

The operating system running on fat client is not a file package with stable and unchanging component, the number and type of its system files is adjustable according to user operation needs.

(2) Flexible Operating Platform.

Flexible operating system does not establish one-one bundled relationship with fat client; it follows OSPU move and run on different types of fat client.

(3) Flexible Network Application.

Flexible operating system used in computer operating under network condition, but also provide basic computer function under non-network condition to ensure basic operation of computer.

5 The Flexible Operating Platform of Flexible Operating System

Flexible operating system has the ability to operate cross-platform, the technical feature of flexible operating platform comprising:

(1) FOS server contains enough system files adapt to different models of fat client, system files are selectively downloaded from FOS server by fat client according to appropriate computer model.

(2) Database of FOS server contains device drivers adapt to different device, fat client according to different device model to download appropriate type of device driver.

(3) The base portion of FOS is integrated in OSPU, the base portion of FOS moves with OSPU to be used in fat client. OSPU contain device driver to make OSPU suitable for different computer models, and the device driver is updated by FOS server in network connected state.

6 The Base Portion of Flexible Operating System

The technical feature of base portion of flexible operating system comprising:

(1) Base portion of flexible operating system is pre-sealed and permanently integrated on OSPU chipset, users and other third parties are not allowed to uninstall, not allowed to modify, not allowed to self-install.

(2) Base portion of flexible operating system combines extended portion to form a complete operating system to provide computer full functionality.

(3) When network disconnected, or in the absence of extended portion of flexible operating system, base portion of flexible operating system independently support basic computer operation, which include starting up OSPU and other components of computer, supporting the attempt to connect network, supporting computer readable medium of basic application operating, the computer readable medium of basic application bundled with operating system.

(4) Base portion of flexible operating system run on different fat client with OSPU, not limited by computer model.

(5) Base portion of flexible operating system combines start function and operation function of computer into one operating system, in order to streamline operating system in computer.

(6) Base portion of flexible operating system does not run directly on thin client, and runs only on fat client, that means it runs on computers equipped with hardware capability of computing and generating user data.

7 The Extended Portion of Flexible Operating System

The technical feature of extended portion of flexible operating system comprising:

(1) Extended portion of FOS does not run independently on fat client, it does not function until it combines with base portion to form a complete flexible operating system.

(2) The system files downloaded from FOS server is adjusted in real time according to user needs of operation, downloads can even be zero.

(3) Extended portion of FOS supports local data computing and local user data generating of fat client.

(4) Extended portion of FOS is not temporarily or permanently saved in OSPU, not saved in other external memory devices of fat client. It automatically disappears after computer power off.

(5) OSPU is the direction indicator of system files download, which fat client is the OSPU to be used, and which fat client is the system files to be downloaded.

(6) Extended portion of FOS does not run on thin clients, but as part of flexibile operating system, it runs on the serving host of thin client.

8 The Flexible User Data Storage Process

In computer with flexible operating system, flexible user data storage process is an integral part of flexible operating process of computer.

Flexible user data storage process comprising:

(1) FOS server storage. User data is automatically transferred from fat client to FOS server and stored in private account. In the storage process, the user data is bound OSPU hardware identification code, and the OSPU hardware identification code is submitted server automatically by system without user intervention.

(2) User data directly to be saved in external memory devices of fat client. In this case, user is required to issue commands to system in advance to prohibit user data transfer FOS server.

(3) double storage. After user data is generated, it is sent to FOS server for storage by system, at same time system according to user instruction to send it to specified external storage device for storage.

9 The Operating System Processing Unit

OSPU is the abbreviation of operating system processing unit, which is the hardware carrier of guiding system of the extended portion of FOS and the storing system of base portion of FOS. OSPU is constituted with a set of nonvolatile ROM chip located in fat client.

The OSPU is a system in package (SiP), which comprising: (1) a nonvolatile storage medium embedding the base portion of FOS; (2) a nonvolatile storage medium storing device drivers downloaded by operation of the OSPU from a FOS Server; (3) a nonvolatile storage medium storing sensitive data of the OSPU; (4) a network processor executed by an application of FOS or a software program to enable communication via a WAN with a FOS Server; and (5) a data processing system to convert the data generated by operation of the FOS Computer to another format, and the data processing system are used to validate the data generated by operation of the FOS Computer.

In FOS Computer, OSPU is the regulatory center of flexible operating system, related technical feature comprising:

(1) The base portion of flexible operating system is pre-sealed and permanently integrated in OSPU chipset.

(2) OSPU accepts the base portion of flexible operating system to be updated by FOS server.

(3) OSPU is a navigation instrument of system file download, it also guide system files of extended portion to be loaded to Random Access Memory of fat client, and guide the combination of extended portion FOS and base portion of FOS in Random Access Memory to from a complete operating system.

(4) OSPU is unique access to send commands to FOS server for file system download, and unique access to accept system files downloaded from FOS server; OSPU hardware identification code is unique mark of fat client identifiable for server.

(5) OSPU is integrated computer readable medium of encryption and decryption, system file downloading commands are encrypted by OSPU before uploading, and only FOS server has capability to decrypt. System files are encrypted by FOS server before downloading and only OSPU has capability to decrypt.

(6) OSPU feedback FOS server the configuration information of operating system on fat client, and guide FOS server to adjust system files of fat client in real-time.

10 Technology Integration Feature of OSPU

OSPU is integrated with all the key technologies of computer with flexible operating system, and its technology integration feature comprising:

(1) Chipset integrated OSPU network connector. OSPU is the only network connector in computer with flexible operating system. When it is applied to fat client equipped with other operating systems and network connector, due to flexible operating system of FOS Computer does not support other network connecting devices, so the original network connector of fat client is no longer work.

(2) OSPU encrypts data information transmitted to FOS server, and decrypts data information received from FOS server.

(3) Chipset pre-sealed install monitoring software, which monitor OSPU hardware identification code and other data carried on chipset, once there is indication of illegal modification of data, it automatically and permanently delete OSPU device driver and stored data information, and leads to complete loss of function of OSPU.

(4) Chipset permanently saves device drivers of fat client downloaded from FOS server. These device drivers do not include OSPU device driver, OSPU device driver pre-integrated on OSPU chip.

(5) OSPU identifies the designation code of application downloaded from network, to verify eligibility of application running on fat client.

(6) OSPU hardware identification code act as mark of fat client identifiable for FOS server, which mixed with other data in network transmission. After server screening, OSPU hardware identification code is used to prove data source.

(7) OSPU chipset integrated anti-hazard computer readable mediums of anti-virus, anti-hacker, anti-phishing software, to pre-filter some malicious data, in order to reduce their attack to FOS server.

(8) OSPU does not apply to thin client for it lack of local computing capability, but it applies to host server of thin-client.

(9) OSPU does not retain traces of user operation.

11 OSPU Hardware Identification Code

11 OSPU hardware identification code is the evidence to be used to prove their authenticity for user or FOS server, the technical features of OSPU hardware identification code comprising:

(1) OSPU hardware identification code is divided into two parts, internal part and external part, external part is series number; internal part is kernel code. Series number for the system clearly shows and for user autonomic use; kernel code is for identification purpose within system, which is not displayed out of system, and not known to user.

Kernel code and serial number are indivisible, and as long as one of them thereof does not match server record, the OSPU the codes belong to will be rejected by FOS server.

(2) OSPU hardware identification code is included in monitoring scope of OSPU monitoring computer readable medium. Illegal modification of data leads to complete loss of function OSPU.

(3) In network account process with OSPU as secret key, OSPU kernel code is automatically used by system to instead of user's personal login information, in this case, user's personal login information down to secondary position, or without use.

(4) In network account activity, an OSPU with system function to take advantage of other OSPU's serial number to exercise control over other OSPUs.

(5) In network transmission, OSPU hardware identification code and user data and system data are bundled, in order to prove the data source to server.

(6) OSPU hardware identification code is to be encrypted during network transmission, only FOS server has ability to decrypt.

12 OSPU Computer Connection Process

The technical features of OSPU computer connection process comprising:

(1) OSPU plug at FOS dedicated computer motherboard. There is no hard drive, no independent network connector on fat client. Fat client is permanently installed half a flexible operating system in OSPU, it need to download another half of system files of FOS from FOS server, and two halves of system files combine into one operating on fat client, then computer function become complete.

(2) Multiple OSPU connects a computer. Then the computer BIOS displays OSPU serial number on menu, ask user from which OSPU to start. It mainly occurs in case of internal and external OSPU used simultaneously.

(3) OSPU externally plugs in a fat client equipped with other operating system. User selects OSPU in BIOS displaying menu, and then original computer hard disk, operating system and network connector lose support of system or hardware, they are no longer working, and fat client enter process of flexible operating system.

13 OSPU Related Network Activity Process

OSPU related network activity process comprising:

(1) Flexible application software sharing process of FOS Computer. In FOS Computer, the storage platform of application is on FOS server, the operating platform of application is on fat client. Server selectively provide application, fat client selectively operate application.

OSPU go through inspection of anti-virus, anti-hacker, anti-phishing software when application uploading FOS server, and identify the security code of application when application downloaded to fat client. The security code is granted by FOS server.

(2) Flexible device driver sharing process. Device drivers of fat client are downloaded from FOS server via OSPU, then to be permanently saved in OSPU chipset.

(3) One user account with multiple users at same time, referred to OMUST, OMUST is a special case of OSPU related network process, which allows an account under control of a master OSPU to be accessed by other OSPU.

(4) Third-party server access process. User access third-party servers using specialized application downloaded from FOS server; in this case, OSPU transformed into a simple network connector, and data of network transmission is restricted to flow to FOS server.

14 Application Software Sharing Process of FOS Computer

Here in particular to explain that: in FOS system, the security authorization code belongs to a link of whole process, rather than an isolated authorization. In addition, "application to be installed in FOS Computer" contains two meanings, (1) application to be put into FOS server's database, (2) application to be temporarily downloaded to fat client to run through OSPU.

The flexible application software sharing process comprising:

(1) Common Application Process.

Common application must be downloaded from FOS server via OSPU; fat client does not install common applications, but common application operating on fat client.

The application search engine is set in user's personal network account, the relevant flie of application user selected to be saved in personal operator interface of account in the form of shortcut.

(2) User-Supplied Application Process.

User-supplied application first accepts hazard inspection of OSPU, and then upload FOS server, suspicious application is blocked to upload by OSPU.

(3) Application Security Process.

FOS server is divided dedicated area to isolate and test application, after confirming safety and confirming there are no duplicate in database, FOS server grant security code to application, and transmit the application into database.

(4) Application Security Code Confirmation Process.

Applications must be confirmed by OSPU on security code before temporarily run on fat client's Random Access Memory.

(5) Temporary Running Process of Application on Fat Client.

Common applications are not saved in OSPU chipset, but even if network connection interrupted, as long as Random Access Memory continues to work, application downloaded in Random Access Memory continues to run.

(6) Third-Party Network Source Application Running Processes.

The common application downloaded from third-party server through special access software should complete all inspecting and deployment process according to flexible application software sharing process before they operate on fat client.

15 Device Driver Sharing Process

The technical features of flexible device driver sharing process comprising:

(1) Users are not allowed to install device drivers on fat client and its OSPU by themself, device drivers required by fat client must be downloaded from FOS server.

(2) FOS server set up device driver database, drivers required by fat client must be downloaded from this database.

(3) Device drivers are downloaded from FOS server to client's OSPU, and permanently saved in OSPU chipset, as long as computer is not replaced, or new hardware is not used, device drivers do not repeatedly downloaded.

(4) User-supplied device driver is uploaded to FOS server after hazard inspection of OSPU, it accepts hazard inspection once again by FOS server, then to be put into FOS server database and then to be downloaded from FOS server to OSPU for permanent storage.

(5) Device Driver files saved in OSPU are in closed state, do not accept user's own modification, but it accepts update by FOS server.

(6) After new device driver to be downloaded, the old device driver saved in OSPU will be automatically removed from OSPU stored data.

16 OSPU Regulatory Process of User Account

OSPU regulatory process of user account comprising:

(1) User account is divided into public account and private account according to necessity of user's personal login information.

Public account with OSPU hardware identification code automatically login without user's personal login information, its account configuration files are part of base portion of flexible operating system stored in OSPU.

When network disconnected, public account does not belong to network account; when network connected, public account obtain network account attributes, and it can be used to download FOS server resource.

Public account is used to upload commands to FOS server, and download data from FOS server, but user data generated in public account is prohibited to be transmitted directly from fat client to FOS server. User data generated in public account is first stored in external storage device of fat client, and then by user optionally upload to private account.

Private account belonging to network account, its account configuration files are part of extended portion of flexible operating system stored in FOS server. Private account is logged in with OSPU hardware identification code and user's login information, the two login information to be used simultaneously.

User data generated in private account upload FOS server for storage from fat client, or taking other way for storage in accordance with flexible user data storage process.

(2) Private account is further divided into general account and special account according to permission of replacing OSPU hardware identification code. In private general account, user's personal login information match FOS server record, but OSPU hardware identification code do not match FOS server record, then user has the option to replace OSPU. In private special account, OSPU hardware identification code is not allowed to be replaced. OSPU hardware identification code do not match FOS server record, even if user's personal login information match with, account login is also completely prohibited.

(3) If users choose to replace OSPU, system will verify more pre-agreed record of user exclusive physiological characteristics or complicated questions and answers, after all the information to be verified, system automatically replaced old OSPU hardware identification code with new one, and user login account.

(4) After replacement of OSPU hardware identification code, old OSPU is disqualified to login private account.

(5) When a new OSPU is used to login personal network account, the operator interface and information saved in personal account are as always.

(6) In private account operating process, OSPU hardware identification code and user personal login information jointly constitute account login security mechanism.

User fingerprint and other personal exclusive physiological characteristics are saved on server to support OSPU hardware identification code.

In special case user want replace OSPU, server will automatically remove original OSPU information after personal exclusive physiological characteristics verification procedure, and replace with new OSPU information.

After successful replacement of OSPU hardware identification code, user personal account is automatically transferred to under new OSPU by server.

User's personal exclusive physiological characteristics belong to alternate means of verification; it does not replace OSPU hardware identification code, and not affect work independence of OSPU.

17 OMUST Sharing Process

One user account with multiple users at same time, referred to OMUST, OMUST belong to a special case of OSPU regulatory process of network account, which allow account to be operated synchronously from a plurality of ports of different location under control of OSPU.

The technical features of OMUST comprising:

(1) The OSPU of main user of account act as master device, it is called master OSPU, and other OSPU qualified to share account act as auxiliary devices, it is called auxiliary OSPU. Master and auxiliary OSPUs are identical in hardware configuration and functions, the only difference are their roles in OMUST.

(2) OMUST allows main user of sharing account to configure the OMUST process through editing sharing list.

OMUST sharing list is computer-readable medium, which determines OSPU sharing feature. OMUST sharing list is displayed unilaterally on account of main user side.

Sharing list is manipulated by main user of account.

(3) In OMUST, after the series number of auxiliary OSPU to be entered in sharing list of OMUST, the kernel code of auxiliary OSPU should also be inspected by FOS server. Auxiliary OSPU send login request to sharing account, and simultaneously send request to FOS server for inspecting its own OSPU kernel code. Only the OSPU kernel code is accepted by FOS server, then the series number of corresponding auxiliary OSPU in sharing list is eligible to participate in OMUST.

(4) Auxiliary OSPU listed in sharing list connecting network, the fat client attached with auxiliary OSPU displays invitation prompt. User clicks on invitation prompt, enter access code agreed in advance, then log in sharing account.

(5) Main user of account is entitled to add serial number of auxiliary OSPU to sharing list to activate sharing feature of some auxiliary OSPU, or main user is entitled to remove serial number of auxiliary OSPU from sharing list to close sharing feature of some auxiliary OSPU.

(6) In sharing list, main user of account set up account sharing permission and restriction scope for each individual auxiliary OSPU.

(7) Main user of account is entitled to activate or lock OMUST sharing process, once OMUST sharing process of account is closed, all auxiliary OSPU lose access to sharing account.

18 Third-Party Server Access Process

The technical features of third-party server access process comprising:

(1) OSPU only exchange data with FOS server, fat client access third-party server, it first have to download third-party server access application from FOS server, and then accessible through the application.

(2) Fat client access third-party server via specialized application, but OSPU is still the only network connector of fat client.

(3) Using specialized application to access third-party server, data of network transmission is not anti-hazard inspected by OSPU, not encrypted by OSPU, not tied with OSPU hardware identification code, and not transferred to FOS server.

(4) When a specialized application to be used to access third-party server, the user data generated on fat client is not automatically stored to FOS server while it is stored from fat client to third-party server.

(5) Before downloaded data from third-party server to be transferred to FOS server for storage, OSPU conduct a comprehensive data safety inspection to prevent FOS server from intrusion, the content of data safety inspection include the inspection of virus, hacker, and phishing computer readable medium.

CHAPTER 5: INVENTIVE STEP

Computer with flexible operating system, referred to the FOS Computer, It is a technical solution of re-build of computer's system architecture and operating process.

Network server has the advantage of resource sharing, but current server's functionality, including large cluster of data processor, is still not strong enough reaching the level that infinitely replace fat clients, and infinitely accept numerous WAN user's request for data processing on server.

The reason why flexible operating system has flexibility, it is because there is network server factor, from this perspective, flexible operating system belongs to network source operating system.

However, flexible operating system contains OSPU OS, which is base portion of FOS, and provides basic computer operation function that regardless of network effects, therefore, from this perspective, flexible operating system also belongs to semi-network source operating system.

From the perspective of base portion of FOS, FOS Computer design semi-network source operating system, which provides a new way for expansion of network server application.

FOS Computer combines both advantages of network platform and fat client, and using an innovative hardware to ensure new system's security and stability.

1 The Inventive Steps of Flexible Operating System

Under existing technology, the popular computer operating system is usually permanently installed on fat client, which is not only suffering from threats of virus and system failure, but also suffering from swelling system files and accumulation of junk files.

Irrelevant system files, or application, or other data accumulated in computer hard disk, they are not as user needs, but takes a lot of computer resources, and become a burden of CUP computing, which often make computer run slower, and even lead frequent computer crash.

There is an existing technology trying to get rid of the plight of fat client, the client platform abandons permanently installed operating system, and run the network source operating system, which is called downloadable OS.

This is a network terminal technology.

Downloadable OS is completely dependent on downloading from server, network signal stability and network channel smoothness become the first requirement of computer startup and operating, but in current technical condition, such a requirement is hard to be effectively guaranteed, which becomes the unfavorable factor of large scale application of terminal technology.

In terminal technology, user data is computed and generated on server, downloadable OS has only function that sent user instructions to server, and download image data from server, the image data thereof is the user data computed and generated by server. So in essence, so-call terminal is only the display of server.

Server's CPU cannot indefinitely increase computing power, which include data processor cluster that IT giant company used, making it overload means to push it into trouble. Therefore in foreseeable future the terminal technology can only be limited to use within local area network.

In contrast, the flexible operating system, referred to FOS, is a semi-network source operating system of computer, which utilizes the advantages of network server, but it not entirely rely on network server.

The most obvious feature is that user data is computed and generated on fat client, rather than being concentrated computed and generated on network server.

Flexible operating system consists of two parts, which are the system files from server, briefly call Server based OS, and system files from OSPU, briefly call OSPU-OS.

Wherein, Server based OS is also called the extended portion of flexible operating system, OSPU-OS is also called the base portion of flexible operating system.

Extended portion of FOS is the extension and supplement of base portion of FOS, which with flexibility to adjust system files in real time.

Compared to operating system permanent installation mode of fat client, FOS is no longer subjected harassment of virus, illegal third-party computer program, junk file accumulation, and system crash.

Compared to terminal technology, FOS breaks through the constraint of system matching of server and terminal, and breaks through the constraints of LAN, and breaks through the constraints of machine model.

Therefore, one of inventive steps of FOS is that it successfully divides a full operating system into two half, one half is base portion and another half is extended portion. Two components of operating system stored in different places far apart, but they can form a complete FOS operating on fat client to support computing and user data generating on fat client.

No matter what an amazing computer functions to be extended in future, the system files that runs on fat client will be kept less quantity, but it also provide unlimited amazing ability.

The another inventive step of FOS is that FOS take into account the network environment and non-network environment, and taking into account a variety of different operating condition.

2 The Inventive Steps of Base Portion of Flexible Operating System.

The popular computer operating system under existing technology is a one-one bundled installation mode, when an operating system is installed on specified computer, it cannot be transferred to another computer for application.

Mobile electronic devices have become a trend, but users still have to carry their personal computers everywhere.

The computer operating system under existing technology is mainly an open software installation mode, which does not deny user to install application on fat client according to their individual preference.

Application installation platform open to users, which is the requirement of operating system functioning, but also the major cause of computer kidnapped by bloated data, which greatly reduce the efficiency of computer operation.

There are some techniques try to change this situation, one of the most representative is network terminal technology.

Terminal is not permanently installed computer operating system, which must first download operating system from server, then to be enabled.

No network condition, terminal is like a waste. Even in the case of networking and the operating system downloaded and terminal enabled, because operation is not with the function of processing and generating user data on client platform, once network is temporarily disconnected, terminal work will be forced to terminate.

However, the Computer with flexible operating system can solve this problem.

Of this technology, the definition of base portion of flexible operating system consists of two parts:

(1) Base portion of Flexible operating system settles in OSPU, so brief call it OSPU-OS.

The base portion of flexible operating system is sealed and permanently integrated in a particular OSPU chipset, while OSPU chipset does not belong to any particular computer, it can be transferred to apply to different platform as user wishes.

Calling it OSPU operating system is for emphasizes its settling place, precisely in order to avoid being confused with traditional operating system bundled with specific fat client.

(2) Base portion of flexible operating system is the part of flexible operating system.

Base portion of flexible operating system not only act as supplement of extended portion of flexible operating system (serve base OS), but also act as the basic operating system of computer in absence of extended portion of flexible operating system (such as no network conditions), and thus forming the computer's ability to run without network.

Base portion of flexible operating system is the important part of flexible operating system, It does not contain insignificant system files and application, and it is regardless of network connection status, all market popular fat client can become a place of its operation, and thus, it make size of operating system operating on fat client smaller, operating more stable, and moving more flexible.

Compared with current popular operating system, the base portion of flexible operating system is not individually possessed by specific fat client, in other words, it is not one-one bundled relationship with specific computer, but follow OSPU to transfer, it can be freely removed from a computer and use to another computer.

Therefore, the two parts of definition of base portion of flexible operating system work together, which makes the computer function with the mobility characteristics and stability characteristics.

This is the inventive steps of base portion of flexible operating system.

Furthermore, base portion of flexible operating system is sealed model.

OSPU carry its own data and files, and it put an end to all foreign software installation, put an end to all data changes other than system update, so that it completely eliminates the security threat of operating system.

This is another inventive step of it.

Compared with terminal technology, the base portion of flexible operating system can keep computer startup and operating in network disconnected, and ensure computer to dispense signal fluctuation in network connected.

Most importantly, the base portion of flexible operating system avoid computer to be a subsidiary object of server as terminal.

3 The Inventive Steps of Extended Portion of Flexible Operating System.

The extended portion of flexible operating system is also briefly called sever based OS, because its system files are from FOS server.

Under current technology, the only one can be used to compare with extended portion of flexible operating system is Downloadable OS of network terminal.

However, downloadable OS's main function is to upload user instructions to server, and download image data from server. Image data is the user data that is already processed and generated by server.

How many functions the server provides, how much performance the network terminal display, and thereby the system files of downloadable OS are no room for increase or decrease.

Server runs blocked, all terminals that connected with the serve will interrupt or slow running, and operating system can do nothing about it.

Downloadable OS is the only operating system in network terminal, but it does not directly generate user data on network terminal by itself, and all data computing are dependent on server, so downloadable OS cannot provide operational flexibility for terminals.

Downloadable OS can only be downloaded from server to specified terminal, it cannot across specified terminal to be downloaded to other type of computer, and thus can be deduced that it is a highly simplified operating system and it is limited to applied only within a small range, such as LAN, in some sense.

In the running process of downloadable OS, server and network terminal should have the same type of system architecture. The demand of computer market is diverse, downloadable OS cannot adapt to a variety of client computer, so it cannot benefit users from a large range.

Involuntary nature of network is downloadable OS's insurmountable obstacles, but the design of extended portion of flexible operating system effectively overcomes this defect.

Extended portion of Flexible operating system is an important component of flexible operating system, which is from network server, but it is only the supplemental part of base portion of flexible operating system, and it does not run independently on fat client.

The inventive steps of extended portion of flexible operating system is that it separate operating system into extended function and basic function, and maintain sufficient flexibility for system file replenishing, such as system files of extended portion of FOS can be downloaded zero, so as to avoid excessive system files and application files to be stacked in fat client.

The system files of extended portion of flexible operating system to be downloaded is based on hardware status of fat client and user operation, which can break the limitation of computer type, and form cross-platform adaptability.

4 The Inventive Steps of OSPU.

OSPU is a hardware device of computer to handle flexible operating system, in addition to ensure system running stable and smoothly, it also functions to ensure system security.

There are two main objectives for viruses and hacker attacks, one is fat client that permanently carried operating system, and other is data transmission link between fat client and server.

In the case of flexible operating system, common data network transmission will to be frequent, and further those system files of extended portion of flexible operating system need to be downloaded, so anti-hazard issue in data transmission become more prominent.

Computer readable medium is a common tool in existing data anti-hazard technology, that confrontation with viruses and hackers are mostly reflected in confrontation of computer readable medium with computer readable medium, like two kind of software to race in equal gap.

Therefore the effect is always unsatisfactory.

In response to this situation, flexible operating system conceived a stronger data anti-hazard tool from a new perspective.

In network terminal, there is downloadable OS from server, but its operating characteristics is completely different from flexible operating system.

In network terminal, there is firmware to act as machine's startup element, but also its function is completely different from OSPU.

Perhaps because of the difference between the two, leading to network terminal cannot jump out of LAN scope.

The inventive steps of OSPU reflected in that it is a dedicated hardware device to process flexible operating system, which enable the flexible operating system jump out of scope of LAN, and serve computer users unlimitedly in the scope of WAN.

At the same time, it combines startup function and operating function of computer into a unified operating system to achieve the desired effect of simplifying structure of computer system.

It centralized integrate many important information and data anti-hazard measures in OSPU chipset, which reinforces checkpoints of anti-hazard, and facilitate the elimination of certain vulnerabilities of anti-hazard, such as providing condition for replacing or strengthen user passwords with OSPU hardware identification code.

It design a sealed system of network data transmission to prevent all external behavior and data intervention, and use it as only channel of data transmission between server and fat client, which is easier to build security barrier.

It elevates OSPU hardware identification code to the primacy, in order to change unequal position of software and hardware in existing data anti-hazard measures.

In addition, OSPU do not leave traces of user action, as well as OSPU with mobile features, which make viruses difficult to lock target, or difficult to launch attack even target is locked.

OSPU block the pathways of viruses and malicious software attacks computer CPU, thereby reducing ultra-high CPU usage.

OSPU do prior inspection for download files and computer program, which reduce system running error of fat client.

All this effect is beyond other existing technologies.

5 The Inventive Steps of Flexible Application Software Sharing Process

Under current technology, application is usually installed on external storage device of fat client together with operating system, and a large number of applications and system files are directly integrated in system software.

The development of computer functions depends on development of application, therefore, popular operating systems always adopt open attitude to installation of application on fat client.

This brings trouble that virus and hack software also belong application, open installation platform, which is equal to open door to virus and hacker.

In addition, a large number of applications integrated into operating system software, resulting in system files increasingly complex and extending, which form a large number of depletion of resources of fat client, and become a reason of system running slow down.

In network terminal or cloud technology, user data is centralized processed and generated on server, therefore, application is bound to be installed on server.

The resulting new problem is that for anti-virus and hacker, server usually take stringent measures to prohibit foreign application uploading, or allow only a limited number of protocol software developer's application uploading, which makes the overall functionality of computer falling instead of rising.

There is no effective application software sharing process, which also formed the major obstacles of network terminal and cloud technology promoting in wider range.

Some literature made concept of specified security code of application, but those ideas are based on "application installed on fat client, using on fat client" case, and focused on design of anti-hazard measure of fat client.

However, faced with fat client open installation mode, the concept of application security code is destined to be rarely effective, in fact, so far no promotion in reality, because the effect of application security code is not only depend on software design, but also depends on computer's feature, depending on functional characteristics of external storage device.

The inventive steps of flexible application software sharing process is that it combine application security code and network anti-hazard process into one, and combine anti-hazard, convenience and efficiency of application into one.

Of which:

(1) Application security code no longer takes client platform as foothold, because its foothold moved to server. It no longer takes fat client anti-hazard as focus, because application only temporarily runs on fat client. Security code is focus more on preventing virus and hack program to threat server.

(2) Security code combines network anti-hazard process to prevent virus and hacker that fake name of common computer program to invade server.

(3) Application storage platform and operating platform are divided in two different locations, so as to reduce opportunity and increase difficulty of virus attack.

Application saved on server, its safety is inspected by server, security code is specified by server, but application do not run directly on server and it run on fat client.

The running place of application is device of Random Access Memory of fat client, once computer shut down, application data will automatically disappear.

This flexible application software sharing process broadens application scope of FOS computer, meanwhile safeguarding fat client and server.

6 The Inventive Steps of OMUST Sharing Process.

OMUST is referred to one user account with multiple users at same time, and it is an important operational process of FOS computer.

Under current technology, users use email or cloud storage service or other similar method to share the computer-generated and saved data with others through network, the common feature of these methods is that network account need user's personal information to be login, such as user name and password.

Login information is programming information, and it is recognized as some of information that extremely unsafe, so people are usually reluctant or afraid to use email or cloud storage service or other similar method to transfer high privacy information to specific third-party to share.

Shortcoming of above method include (1) account's login procedures too cumbersome, such as cloud storage repeated login, email multi-link operation, or (2) demonstrate delay such as email, or (3) data lost during transmission, such as email, or (4) lack of control by account-holder, once a third party successfully logged in his account, the entire content of account will be fully exposed.

The biggest problem above methods face with is the precise positioning of data to be transferred to specific person. Log in with login information, but programming login information is not exclusive, no matter how many people get login information, they can login same account and access same account content.

The inventive steps of OMUST sharing process are reflected in that it successfully overcomes above Shortcoming.

With OSPU hardware information to replace or strengthen user login programming information, due to unique and exclusive feature of hardware, data can be accurately transmitted to a specific party to share with.

With OSPU hardware information as key of account login, users' personal information becomes dispensable or not be effective alone, which simplifies the login procedure, enhanced login security, and demonstrate shared data in real time.

With OSPU hardware features to prepare sharing list, by adding and deleting OSPU serial number in sharing list to control data sharing party, by authorization mechanism to control permission scope of a OSPU, by locking OMUST sharing process to limit all third-party OSPU login and restore account confidential.

In OMUST, data network sharing becomes controllable, simple and secure.

7 The Inventive Step of OSPU Hardware Identification Code.

Under current technology, password, user personal information and some computer software code is the primary means of data anti-hazard. Server identify fat client with IP address, network account accept login with password and user name.

However, IP address and the user's account login information is generally recognized as unsafe factor that they not only difficult to effectively protect data security, instead, virus and hacker often use one as guide for their invasion to server, and even become their invasion keys.

Data intercepted by hacker across network during transmission, most cases are associated with IP and user account login information.

In contrast, hardware information can be arbitrarily increased complexity, and be arbitrarily added complex encryption code, so that it is difficult to replicate.

OSPU chipset even install monitoring software to monitor internal data, once any data, including OSPU hardware identification code, is illegally modified, the software will automatically and permanently delete OSPU device driver and stored data information, and make OSPU loss of function.

OSPU hardware identification code is unique and exclusive, that with it to instead software code will inevitably enhance reliability of data anti-hazard measures.

Some literature discussed the importance of computer hardware information from perspective of server identification, and they also proposed ideas that use it to replace software security code, but those ideas took fat client hardware as object of consideration.

Computer hardware cannot become specific user identity token, and under existing technology, the data flow channel in computer cannot with high strength exclusive.

Therefore its hardware information cannot replace IP and user login information, and those ideas of replacement of software security code are difficult to put into practice.

OSPU hardware identification code makes it easy to bring people's desire into reality, the desire is that with device hardware information of computer to replace computer IP and user's account login information, or downgrade user's personal login information to secondary status.

This is one of inventive steps of OSPU hardware identification code.

Furthermore, OSPU hardware identification code bundle other transmission data in network as data anti-hazard measure, which increases the anti-hazard strength of network activity.

OSPU is a component of computer hardware, its identity token is not identity token of entire computer machine, its failure is not failure of entire computer machine, which to some extent facilitate computer incident handling.

OSPU is a mobile device that follow user to move and use in different computer, similar to a key to open door, so its hardware identification code can be specific to a user, and act as his identity token, and with it to replace his personal login information of network account.

OSPU is a dedicated channel of data network transmission, and only channel of data transmission between fat client and FOS server, which is the best place integrated anti-hazard measures, meanwhile, OSPU hardware identification code instead of computer's IP to act as identity token of fat client, which is also the best network security solution.

OSPU hardware identification information is divided into two parts, internal and external, which also facilitates automatic and intelligent collaboration of fat client and server.

8 The Inventive Steps of Flexible Device Driver Sharing Process.

Under current technology, the mainstream operating system has its own matching computer models, includes all device drivers for its own range, and device drivers are permanently installed on fat client, so they do not require to design additional special device driver sharing process.

However, switch to network source operating systems, such as network terminal, there is no operating system permanently installed on client platform, and the host server does not provide extra device drivers to its terminal, so it can be deduced that is one of reasons why terminal technology cannot freely choose fat client and server cannot cross specified platform to implement in a wider range.

If network source operating system wants successfully running on different computer models, it must first have device driver operating process that is able to adapt to different computer models, and this process must meet at least three conditions:

(1) Server has device driver database with rich resource, because device drivers of fat client can only be downloaded from server.

(2) Fat client is equipped with an intelligent selection mechanism that can accurately select appropriate device drivers from server database.

(3) Fat client is assigned a specific room for saving device drives that downloaded from server.

These conditions above just constitute the component of FOS device driver sharing process.

This device driver sharing process can make flexible operating system to be applied to a variety of type of computer.

So it broaden application area of network source operating system, make device drivers installation easily and running smoothly, and guarantee the security of device driver software.

This is one of inventive steps of FOS device driver sharing process.

In FOS computer, there is no hard drive in fat client that permanently installed operating system, and files of device driver can only be saved in OSPU chipset.

In FOS computer, OSPU is a sealed system, and it rejects out-system data or none-system-predetermined data to be saved in it.

User-supplied device driver must first upload server, go through hazard inspection, and then enter FOS server database, and then to be downloaded to OSPU for save.

In addition, after first download, device drivers will be permanent saved in OSPU, as long as computer model do not change, there is no need to be repeated downloaded, so as to speed up computer startup.

9 The Inventive Steps of Flexible Startup Process of Computer

Flexible start the process of computer has two meanings, one refers to that more than one OSPU applied to a computer, and the second refers to that OSPU applied to a computer equipped with other operating system.

The inventive steps of flexible startup process of computer are mainly in latter case.

BIOS detect to find new external storage device, it will a prompt and ask user from which device to startup.

Under current technology, the specific operating system contains specific number and variety of device driver and other files, and is limited to run on a specific computer models, in this case, flexible startup process of computer is trivial and insignificant.

Now, however, the OSPU of FOS Computer concentrated contains various operational elements, such as anti-hazard measures, flexible operating system, FOS device driver sharing process, FOS application software sharing process and network connector.

Flexible startup process of computer is not only the startup of a new operating system, but also the startup of a new computer operating mechanism.

It startup a new mode of operation of computer, but it does not require user to replace original computer in use.

Specifically, the inventive steps of flexible startup process of computer are in:

(1) There are two data flow channels in one computer, which provides emergency measure for system failure.

Today computer has become an indispensable tool in working and living for many people, but user always face with headache thing that viruses and pirated software proliferation, and system frequent failure.

System failure occurs, user have to time-consuming, energy-consuming, and money-consuming to wait for professionals to restore, at this stage, computer becomes a waste, even the most urgent matters can only be forced to interrupt.

However, with Flexible startup process of computer, user no longer needs to worry about system failure. As long as OSPU is plugged in computer, computer will be based on flexible operating system to quickly return to normal, and user can do every operation.

The most important thing is that this emergency measure is simple, easy to operate and easy to promote; users do not need expertise, and they can immediately see the effect.

(2) A computer platform runs two different computer mechanisms, which is equal to double insurance for computer operation.

Traditional computer occupied market for decades, users are already familiar with it, get used to it, even if there are better technologies emerge, people may not be willing to replace it.

With flexible startup process of computer, OSPU can run on different computer, which same as adds a new feature in traditional computer, user will be able to avoid dilemma of computer replacement.

Certain process of transaction, users feel safe and reliable to use traditional computer, they startup traditional computer; while some transactions, users feel safe and reliable to use FOS Computer to process, and they startup FOS Computer.

The option of OSPU startup is controlled by user, that is because user's judgment usually most objective and pragmatic.

(3) OSPU made into stand-alone electronic appliances, which greatly facilitate normalized use of flexible startup process of computer, and to accelerate the promotion of FOS Computer.

OSPU in flexible startup process is certainly an external plug-in device.

The external plug-in device under existing technology is normally regarded as cumbersome.

However, OSPU in flexible startup process of computer has obvious practical use, and OSPU will be designed to be a portable consumer electronic product with some other everyday uses.

Mobile phone and electronic watch and so on can be integrated OSPU function, and act as OSPU to become external plug-in device in flexible startup process of computer.

10 The Inventive Steps of OSPU Joining Network Public Activity

The inventive steps of OSPU joining network public activity lies in:

(1) In traditional computer mode, server has its own anti-hazard measures, fat client also has its own anti-hazard measures, the anti-hazard measures of both ends are often separated from each other, in particular, the fat client lack of strong measures to block virus attacking server from fat client.

After OSPU join network activity, the anti-hazard measures of fat client is no longer confined to fat client, but extends to server. In this case all public network activity have been included in control of OSPU.

OSPU hardware identification code become secret key of access of network process, this key lies in user's hand directly, which is equal move anti-hazards network from server to the forefront of fat client.

(2) With network technology advance, market emerged a wide variety of combination products of computer and TV set, but TV set is a public platform, computer is a personal special tool, the problem lies in the integration of two is how to balance their characteristics.

In this case, OSPU can play a regulatory role.

OSPU hardware identification code is the startup button of network account, and user's personal login information is the convert button of account type.

Users enter login user name and password, display shows private account, then machine is user-specific computer, which can be engaged in operation of privacy.

After private network account exited, display shows public network account, then machine is a TV set, which is primarily for viewing images. In this case, user data is prohibited to be uploaded from fat client to FOS server, which simultaneously ensures security of server and private account.

CHAPTER 6: BEST MODE FOR CARRYING OUT THE INVENTION

There are four components in operating environment of FOS Computer, namely: fat client computer, OSPU, flexible operating system, and FOS server. Among them, the fat client computer and OSPU and flexible operating system get together to form FOS computer.

Flexible operating system in FOS computer is divided into two portions of base portion of FOS and extended portion of FOS. These two portions contain different FOS files, and they are stored in different places. Wherein the system file of base portion of FOS is stored in OSPU and the system file of extended portion of FOS is stored in FOS server.

OSPU is a portable hardware device in invention of FOS Computer, and only the fat client equipped with OSPU capable of running flexible operating system.

Each OSPU has its network connector and its unique hardware identification code. The hardware identification code of OSPU contains two subdivided codes, they are: series number and kernel code.

OSPU mainly provide seven functions in running of FOS Computer, which are: connecting network, guiding startup of flexible operating system, guiding system files of FOS into random access memory of fat client, encrypting or decrypting network transmitted data, inspecting security code of application issued by FOS server, preliminary monitor safety of data that is send to FOS server, storing device drivers of fat client.

Implementation of Start-Up Process of Flexible Operating System

See FIG. 2

When fat client user send a request for starting up flexible operating system to computer, the request will be encrypted by OSPU (B of FIG. 2), the OSPU then try to connect FOS server. In this case, there are two attempt results will to be: successful connecting and connecting failed.

Here are two different attempt results and subsequent processes:

1. Successful connecting: OSPU send startup request that encrypted by OSPU to FOS server (D of FIG. 2), meanwhile, OSPU encrypt its own hardware identification code and sent it to FOS server.

The two kind of encrypted data to be sent FOS server, simultaneously OSPU release system files of base portion of FOS to random access memory of fat client (F of FIG. 2).

FOS server receives this two kind of encrypted data from fat client, and decrypts the data. After data to be successfully decrypted, FOS server confirms the series number and kernel code of OSPU. After hardware identification code of OSPU to be successfully confirmed, FOS server will encrypt system file of extended portion of FOS and release it to OSPU that consistent with previous received hardware identification code (C of FIG. 2).

OSPU receives encrypted system file of extended portion of FOS and decrypt them, and then guide the system file to random access memory of fat client (A of FIG. 2).

In random access memory of fat client, the base portion of FOS and the extended portion of FOS are integrated together, and then startup process of flexible operating system complete.

2 Connecting failed: OSPU decrypt the previous encrypted startup requests of flexible operating system, and then OSPU release the system file of base portion of FOS to random access memory of fat client (F of FIG. 2), and then startup process of flexible operating system complete.

In full startup process of flexible operating system, the startup request, the data to be sent to FOS server, the single or twice guiding process of system files of FOS transmitted to random access memory of fat client, and the transfer process of other user instructions are co-operated and jointly completed by fat client hardware and OSPU (E of FIG. 2).

After flexible operating system to be successfully started up, users will face the request of account login. In flexible operating system, user account is divided into two types: public account and private account.

Among them, public account acts as default login account. After flexible operating system to be successfully started up, the public account will be automatically logged in the account configuration file of public account belonging to system files of base portion of FOS, public accounts can login when network disconnected.

Public account to be used in flexible operating system does not require user registration. When user logs in account, he does not need to provide user name and password, but when a public account is used, user data generated in fat client will not be saved to FOS server.

Account configuration files of private accounts in flexible operating system belonging to extended portion of FOS, private account must be in network connecting state to be logged in.

When using private account under flexible operating system, user data generated on fat client will be automatically default to be stored in FOS server, but user have option to close the automatic storage function.

Before first use of private account, user registration is required. When registering a private account, flexible operating system will ask user to provide personal information and login information, and automatically collect OSPU hardware identification code of registration. FOS server will bind user's personal information, login information and OSPU hardware identification code, and then save them after binding.

Personal information users provide when registering, and other login information in addition to password, they cannot be modified in future use.

Private account under flexible operating system is divided into two types, namely: general account and special account. At the time of registration of special account, once OSPU hardware identification code successfully bind user provided personal information and login information, this binding information cannot be modified.

When registering general account, if OSPU hardware identification code information collected under flexible operating system is requested to be altered in future, users can rebind new OSPU hardware identification code information after FOS server successfully confirm user additional strengthening personal information and login information.

Implementation of Login Process of Private Account Under FOS Computer

See FIG. 3

Here is detail implementation with FIG. 3 below:

When user of fat client sends request to login in private account, the request and accompanied login information entered by user will be encrypted by OSPU (B of FIG. 3), simultaneously OSPU encrypt its own hardware identification code.

OSPU then transmit encrypted login requests to FOS server (D of FIG. 3), meanwhile OSPU transmit encrypted user login information and encrypted OSPU hardware identification code to FOS server.

FOS server will decrypt the three encrypted data after receiving. After data to be successfully decrypted, FOS server first compares the received user login information with server-side record to inspect the accuracy of information and decide the type of account to be logged in.

Here will be two inspection results of user login information, they are: incorrect and correct. The following are the subsequent process of two different inspection results:

1. Incorrect:

In this case, FOS server judges the input information as error or new user, and then provides user the appropriate verification invitation or registration function.

2. Correct:

The user login information is confirmed to be correct by FOS server, at the same the FOS server compares the received OSPU hardware identification code with the server-side record, and there are two results of comparison, they are: same and differ.

(1) The result is "same": FOS server will temporarily bind the received OSPU hardware identification code with server stored user account information. After successful binding, FOS server extract and encrypt all login data related to account, and send the encrypted data to corresponding OSPU of fat client (C of FIG. 3).

OSPU will decrypt the encrypted account login data after receiving, and then guided account login data into random access memory of fat client (A of FIG. 3). In random access memory of fat client, account login data and system files of FOS are integrated together, and then account registration complete.

(2) The result is "differ": flexible operating system will determine whether to require user to provide some other user personal exclusive information that previously saved on FOS server, such as fingerprint and other user physiological characteristics, according to information of account type and registration record. There are two results based on type of account:

(I) Special account: Account login to be directly rejected, the user personal exclusive information is not required to be provided.

(ii) General account: Flexible operating system will ask user to provide the user personal exclusive information that same as registration.

If personal information that user provided is deferent from the record that saved in FOS server, account login will be rejected.

If the user personal exclusive information that user provided is the same as the record in FOS server, the old record of OSPU hardware identification code will be replaced with the new OSPU hardware identification code by FOS server.

After OSPU hardware identification code to be successfully replaced, FOS server will temporarily bind the received OSPU hardware identification code with relate user account information that stored server.

After data successful binding, FOS server extract and encrypt all login data of related account, and send the encrypted data to corresponding OSPU of fat client (C of FIG. 3).

OSPU decrypt the encrypted account login data after receiving, and then guide account login data into random access memory of fat client (A of FIG. 3). In random access memory of fat client, account login data and system files of flexible operating system are integrated together, and then account registration complete.

Another point added:

Private account login process under FOS Computer must be run in network connecting state. Instead, public account login process under FOS Computer does not require in network connecting state.

In private account login process of FOS Computer, the FOS login request, the data to be sent FOS server, the process of guiding account login data into random access memory of fat client, and the transfer process of other user instructions are co-operated and jointly completed by fat client hardware and OSPU (E of FIG. 3).

Implementation of Data Storage Process

See FIG. 1

After flexible operating system to be successfully started up and account to be successfully logged in, the user data generated in the course of user operating have different way to be stored. Here is data storage process that based on two different types of accounts:

Public account: after the user data is encrypted by OSPU (B of FIG. 1), the encrypted file generated. Then OSPU guide and temporarily store these encrypted file in random access memory of fat client (A of FIG. 1).

If user chooses to save user data to external storage device of fat client, OSPU first decrypt the encrypted file that stored in random access memory of fat client, and restore user data, then OSPU save the decrypted and restored user data to a user-specified external storage device of fat client, thus, user data storage process complete.

Private account: User data is encrypted by the OSPU (B of FIG. 1), and encrypted file generated, OSPU then guide and temporarily store the encrypted file in random access memory of fat client (A of Figure). Thereafter, there are two different user data storage process available for OSPU according to current network connecting state.

Here is subsequent process of two different network connecting states:

(1) Network disconnected: If user chooses to save user data to external storage device of fat client, OSPU will first decrypt the encrypted files that stored in random access memory of fat client, and restore user data, then OSPU will save the decrypted restored user data to a user-specified external storage device of fat client, thus user data storage process complete.

(2) Network connected: OSPU preliminarily test safety of the encrypted user data, after safety testing, OSPU will send the encrypted user data to FOS server (D of FIG. 1). Meanwhile, OSPU encrypt itself hardware identification code, then sends itself hardware identification code to FOS server.

After the two encrypted data to be received by FOS server, they will be decrypted and restored by FOS server, and to be conducted comprehensive safety test by FOS server, and after user data successfully pass safety testing, it will be saved by FOS server in related user account that temporarily bind OSPU hardware identification, and then FOS server encrypt and send a message to corresponding OSPU of fat client about data successful save (C of FIG. 1).

OSPU receives the message of data saved, and decrypt the message and guide the message to random access memory of fat client (A of FIG. 1). In random access memory of fat client, the message and system files of FOS combine together, then user data storage process complete.

If user chooses to save the user data to external storage device of fat client, OSPU will first decrypt the encrypted file that stored in random access memory of fat client, and restore user data, then OSPU save the decrypted and restored user data to user-specified external storage device of fat client, thus user data storage process complete.

In full user data storage process, the user data generating of fat client, the data to be sent to FOS server, the guiding process of user data to random access memory of fat client, the guiding process of message of data successful save, and transfer process of other user instructions are all operated by hardware of fat client and OSPU jointly (E of FIG. 1).

In practical application, because OSPU is a mobile device, and each OSPU contains its own device driver (OSPU device driver can be updated by FOS server), therefore OSPU can be installed in a variety of different types of fat client, and because every fat client that equipped with OSPU can run flexible operating system, therefore flexible operating system capable of running on a variety of different types of fat client.

Implementation of Flexible Operating System Operating on Different Types of Fat Clients Users turn on computer of fat client that equipped with OSPU, the computer then enter startup process of flexible operating system.

In network connecting state, OSPU collect hardware information data of fat client that transmitted by BIOS of fat client, and encrypt the data, and then sent the data to FOS server.

After data to be received, FOS server decrypts the encrypted hardware information data.

After data to be successfully decrypted, FOS server will be based on the received data to judge the type of fat client, then FOS server select the system files of extended portion of FOS that suitable the type of fat client, and encrypt the selected system files of extended portion of FOS.

After data to be successfully encrypted, the encrypted system file of extended portion of FOS to be sent to OSPU of fat client by FOS server, then OSPU decrypt the encrypted system file of extended portion of FOS, and guiding the system files of extended portion of FOS into random access memory of fat client.

In random access memory of fat client, the system files of base portion of FOS and the system files of extended portion of FOS are integrated together. This process makes flexible operating system capable of running on any of fat client that equipped with OSPU.

However, different type of fat client have different hardware configuration, to make flexible operating system better cooperate with other hardware within fat client, FOS Computer design the flexible device driver sharing process.

In this case, when fat client that equipped with OSPU is started up, OSPU will collect the hardware information data of fat client that transmitted by BIOS, and do comparison with hardware information data of fat client that previously saved in OSPU.

Here are three results of comparison:

1. The hardware information data of fat client that stored in OSPU entirely match the collected hardware information data.

2. There are no any stored hardware information data of fat client in OSPU.

3 The hardware information data of fat client that stored in OSPU do not match the collected hardware information data.

In the case of 1:

OSPU release the system files of base portion of FOS to random access memory of fat client, and then release the device drivers to random access memory of fat client. In random access memory of fat client, device drivers and system files of flexible operating system combine each other.

In flexible device driver sharing process, the collection of fat client hardware information data, the sending of driver data to FOS server, the releasing process of device driver to random access memory of fat client, and the transfer process of other user instructions are jointly operated by fat client hardware and OSPU.

In the case of 2 and 3:

If the OSPU is not a new to be enabled, OSPU delete the hardware information data of fat client in it, store and encrypt the collected new hardware information data of fat client, and simultaneously release the system files of base portion of FOS into random access memory of fat client.

Then the base portion of FOS will prompt user to select the type of computer, and sent the result of user selection to OSPU.

OSPU receives and stores and encrypts computer type data of fat client, then sends the encrypted computer type data together with other hardware information data of fat client to FOS server.

FOS server receives both of encrypted data, then to decrypt them. After data to be successfully decrypted, FOS server will be based on the collected information data of hardware and computer type of fat client to choose suitable configuration of device driver for fat client.

Thus FOS server will judge whether there is suitable device driver in database of FOS server, and decide whether to enter subsequent process in accordance with the result of judgment.

Here are two different judgment results and subsequent processes:

(1) Suitable device driver exists in database:

FOS server encrypts the selected device driver, and then sent the encrypted device drivers to OSPU of fat client.

OSPU receive and decrypt the encrypted device drivers, and save the device drivers in OSPU itself, and finally, OSPU release device drivers to random access memory of fat client.

In random access memory of fat client, device drivers and system files of flexible operating system file combine each other.

(2) Suitable device driver doesn't exist in database:

FOS server encrypts and sends a message of no find of suitable device drivers to relevant OSPU. OSPU receives the message and decrypts the encrypted message, then make computer enter flexible operating system startup process.

After flexible operating system to be successfully started up and user private account to be successfully logged in, user upload the device drivers that need to be installed on fat client to FOS server via external storage device, and in the upload process, the device drivers are encrypted by OSPU.

FOS server receives the encrypted data of device driver and decrypt and restores the data, after data to be successfully decrypted and restored, then FOS server do isolation scan for the received device drivers. After safety of device driver to be confirmed, FOS server saves the received device drivers in database of FOS server.

After the device driver to be successfully saved into database of FOS server, FOS server sends an encrypted message to private accounts of fat client user about new save of device drive.

When above process successfully complete, fat client needs to be restarted. Then user operate according to the content of "suitable device driver exists in database", the installation process of device driver complete.

Each new device driver to be stored in database of FOS server will take effect immediately for all users of FOS Computer.

Implementation of OMUST Sharing Process

See FIG. 4

One user account with multiple users at same time, which is referred to as OMUST, OMUST belong to specific feature of FOS computer, and this feature only be used after private account to be logged in.

When user login private account, the OSPU hardware identification code and the user personal login information needs to be jointly sent to FOS server, wherein the OSPU hardware identification code contains series number of OSPU (E of FIG. 4).

When user activates OMUST functions after private account to be logged in, the private account immediately becomes a sharing account. Meanwhile, according to the series number of OSPU that request to activate OMUST function (B of FIG. 4), FOS server authorizes the OSPU to be the master device of sharing account (A of FIG. 4).

In OMUST function, the user with master OSPU has the top privilege of sharing dominance of account.

After authorization to be made by FOS server, user with master OSPU can prepare sharing list of OMUST, and add some other series numbers of OSPU to sharing list (F of FIG. 4).

After one or more series number of OSPU to be successfully added in sharing list, FOS server will be based on the sharing list to send sharing invitation to OSPU that has corresponding series number and ask for login sharing account (D of FIG. 4).

While OSPU connect FOS server via network, it will sent the information of its hardware identification code to FOS server (C of FIG. 4).

Once the FOS server detects that the OSPU with corresponding series number in sharing list to access the FOS server, the FOS server will authorize the OSPU to be an auxiliary OSPU of sharing account, and to issue an access invitation to the OSPU for login sharing account, thus, OMUST activate process complete (J of FIG. 4).

In the process of OMUST running, the sharing list can be updated at any time by user of master OSPU, and FOS server will increase or decrease the auxiliary OSPU that access sharing account based on the changes of sharing list (G of FIG. 4).

Only the user of master OSPU entitled to set access permission for user data of sharing account (H of FIG. 4).

CHAPTER 7: REFERENCE

1. NETWORK TERMINAL OPERATED BY DOWNLOADABLE OPERATING SYSTEM AND OPERATING METHOD THEREOF, Song, Jan. 15, 2009
2. SYSTEM FOR PREVENTING UNAUTHORIZED ACQUISITION OF INFORMATION AND METHOD THEREOF, Furuichi, Mar. 18, 2010
3. Networked computer system, Hughes, Feb. 8, 2005
4. Method and system for protecting software applications against static and dynamic software piracy techniques, Smith, Sep. 19, 2006
5. Method and system for thin client configuration, Richter, Aug. 30, 2011
6. THIN-CLIENT SYSTEM, ACCESS CONTROL METHOD, AND ACCESS CONTROL METHOD IN SAME, KIMIZUKA, Masahiko, Jun. 10, 2011

The invention claimed is:

1. A computer (FOS computer) operating on a fat client comprising:
   a power supply to supply power to the fat client;
   a nonvolatile storage medium to store a basic input/output system (BIOS);
   a central processing unit (CPU) to carry out the instructions of a computer program by performing the basic arithmetical, logical, and input/output operations of the fat client;
   an operating system processing unit (OSPU);
   an Input/Output (I/O) port connected to the OSPU and connectable to at least one user interface, wherein a manipulation of the at least one user interface by a FOS computer user is received via the I/O port,
   a flexible operating system (FOS) comprising:
      a base portion of the FOS and
      an extended portion of the FOS,
      wherein the FOS is configured to control operation of the OSPU and the CPU,
      and wherein the extended portion of the FOS is stored on a server (FOS Server);
   the OSPU comprising:
      a random access memory (RAM),
      a nonvolatile storage medium storing:
         the base portion of FOS,
         device drivers downloaded by operation of the OSPU from the FOS Server,
         sensitive data of the OSPU,
         a program programmed to monitor the sensitive data of the OSPU and delete all the sensitive data of the OSPU if the sensitive data of OSPU is edited;
      a network processor executed by an application of the FOS or a software program to enable communication via a WAN with the FOS Server, and
      a data processing system to convert the data generated by operation of the FOS Computer to another format and to validate the data generated by operation of the FOS Computer,
   wherein the OSPU guides the integration of FOS, and
   wherein the OSPU is to be initialized by operation of the BIOS to load the FOS by first loading a boot loader of the FOS in the OSPU, and the OSPU is further initialized by operation of the BIOS to enable a connection between the FOS Server and the fat client, and
   wherein a serial number of OSPU and a kernel code of OSPU instead of Internet Protocol address (IP address) are used to serve as a fat client identification and location addressing to the FOS Server;
   wherein the RAM is to store the base portion of FOS and the extended portion of FOS, wherein the base portion of FOS is outputted by operation of the OSPU after the BIOS initializes the OSPU, and wherein the extended portion of FOS is downloaded by the operation of OSPU from the FOS Server after the OSPU outputted the base portion of FOS.

2. The FOS computer of claim 1, wherein the at least one user interface includes a keyboard and a mouse to receive manipulations of the FOS Computer user.

3. The FOS computer of claim 1, wherein the I/O port is at least one of a parallel port, a IEEE 1394 interface, a serial port, a SCSI, or a USB port, and wherein the I/O port is connectable to at least one of a USB device, a printer, a scanner, an external hard drive, a monitor, a speaker, a microphone, a touch screen, or a remote control.

4. The FOS computer of claim 1, wherein the sensitive data are serial number of the OSPU, kernel code of the OSPU, and a program programmed to instruct how OSPU performing tasks assigned by the operation of the FOS Computer.

5. The FOS computer of claim 1, wherein the RAM is a volatile memory to store the flexible operating system is also used as a working memory and has a capacity of 64 MB or more.

6. The FOS computer of claim 1, wherein the nonvolatile storage medium is ROM or flash memory and the capacity of the nonvolatile storage medium is 16 MB or more.

7. The FOS computer of claim 1, comprising a semi-network operating system, wherein the semi-network operating system is an operating system having a base portion on a fat client and a extended portion on a remote server.

8. The FOS computer of claim 1, wherein the FOS is a semi-network operating system, the FOS comprising: a base portion of FOS embedded in OSPU and be outputted to the RAM by operation of the OSPU after the BIOS initializes the OSPU; and
   an extended portion of FOS downloaded by the operation of OSPU from the FOS Server and stored in the RAM after the OSPU outputted the base portion of FOS.

9. The FOS computer of claim 1, wherein the base portion of FOS comprises the following components:
 a kernel of FOS to provide the most basic level of control over all of the fat client's hardware devices;
 a program execution allowing an application program to interact with the fat client's hardware only by obeying rules and procedures programmed into the FOS;
 memory management of the FOS to ensure that a program does not interfere with memory already in use by another program;
 networking of the FOS to allow the fat client to participate in a common network for sharing resources using either wired or wireless connections,
 wherein the resources are application software, files, device drivers, printers, and scanners; and disk access and file system of FOS to work together with the networking of FOS allowing a fat client user to save files to or view files from an external storage device and a FOS Server.

10. The FOS computer of claim 9, wherein the sharing resource is a method comprising:
 an application software sharing process;
 an one user account with multiple users at same time sharing process, (OMUST sharing process);
 a device driver sharing process.

11. The FOS computer of claim 10, wherein the application software sharing process comprising:
 power-up the FOS Computer;
 initializing the OSPU by operation of the BIOS stored in a nonvolatile storage medium on the fat client;
 loading the base portion of the FOS to the RAM by first loading boot loader of FOS in the OSPU;
 using the OSPU to enable a connection between the fat client and the FOS Server;
 the OSPU downloads the extended portion of the FOS from the FOS Server, and stores the downloaded extended portion of the FOS to the RAM;
 login to a FOS user account by a user with a serial number of OSPU and a kernel code of OSPU as a credential;
 sending an application software selected by the user through the OSPU to the FOS Server by operation of the FOS;
 the FOS Server confirms safety of the received application software by using a program installed on the FOS Server;
 the FOS Server programs a security code to the application software that passed the safety confirmation;
 the FOS Server stores the application software in a FOS Server database;
 a user search of the FOS Server database for available application software by using search function programmed in the FOS is performed;
 a selection is made of the desired user chooses application software from the FOS Server database by using a program in the FOS;
 the OSPU downloads the chosen application software along with its associated security code from the FOS Server to the RAM on the fat client;
 the OSPU confirms the security code programmed in the application software by using a program in the OSPU;
 the application software is executed by the CPU on the fat client.

12. The FOS computer of claim 10, wherein the OMUST sharing process comprising:
 power-up the FOS Computer;
 initializing the OSPU by operation of the BIOS stored in a nonvolatile storage medium on the fat client;
 loading the base portion of FOS to the RAM by first loading boot loader of FOS in the OSPU;
 using the OSPU to enable a connection between the fat client and the FOS Server;
 the OSPU downloads the extended portion of the FOS from the FOS Server, and stores the downloaded extended portion of the FOS to the RAM;
 login to a FOS user account by a user with a serial number of OSPU and a kernel code of OSPU as credential;
 a OMUST function is launched by the user by using a specific program designed for launching the OMUST function in the FOS;
 the FOS assigns top privilege to the user using the OSPU with the same serial number provided by user when the user registered the account;
 the addition of other user entered serial numbers of other OSPUs into a sharing list by using a program in the OMUST function;
 the FOS allows the user using the OSPU having the same serial number in the sharing list to access the user account.

13. The FOS computer of claim 10, wherein the device driver sharing process comprising:
 power-up the FOS Computer;
 initializing the OSPU by operation of the BIOS stored in a nonvolatile storage medium on the fat client;
 loading the base portion of the FOS to the RAM by first loading boot loader of the FOS in the OSPU;
 using the OSPU to enable a connection between the fat client and the FOS Server;
 OSPU downloads the extended portion of the FOS from the FOS Server, and stores the downloaded extended portion of the FOS to the RAM on the fat client;
 a user login FOS user account with a serial number of OSPU and a kernel code of OSPU as credential;
 a device driver selected by a user is sent through OSPU to the FOS Server by operation of the FOS;
 the FOS Server confirms safety of the received device driver by using program installed on FOS Server;
 FOS Server stores the device driver in FOS Server database;
 a user search of the FOS Server database for available device drivers by using search function programmed in the FOS is performed;
 the desired device driver is chosen by a user selection from the FOS Server database;
 the OSPU downloads the chosen device driver from the FOS Server to the RAM on the fat client;
 the OSPU stores the downloaded device driver in the nonvolatile storage medium within.

14. The FOS computer of claim 1, wherein the extended portion of FOS comprising the following components: security of FOS to provide a form to be used identifying a requester identity in operation of the FOS, wherein the form is a user name, the serial number of OSPU or the kernel code of OSPU; and device drivers to allow interaction with the fat client's hardware devices.

15. The FOS computer of claim 14, wherein the identifying a requester identity is a method comprising:
 a user login process to be initialized by operation of the FOS to allow the FOS Server assign different privileges to different user accounts, wherein a serial number of OSPU, a kernel code of OSPU, a user name, and a password are used as credential to access an account in the user login process, and
 wherein the different user accounts are public account and private account;

a transferring data identification process to be initialized by operation of the FOS to allow user data saves to the FOS Server, wherein a serial number of OSPU and a kernel code of OSPU are used as credential of data to allow the FOS Server to identify the user data and saves the user data to the user account associated with the serial number of OSPU and the kernel code of OSPU.

16. The FOS computer of claim 15, wherein the user accounts comprise:
   a public account having its account configuration file belonging to the base portion of the FOS and the configuration file is stored in the OSPU, a FOS collected data containing OSPU hardware identification code is required by operation of FOS when user login the public account;
   a private account having its account configuration file belonging to the extended portion of the FOS and the account configuration file is stored on the FOS Server, a FOS collected data containing a OSPU hardware identification code, a user name, and a password are required by operation of the FOS when user login the private account.

17. The FOS computer of claim 16, wherein the OSPU hardware identification code include:
   the serial number of OSPU and the kernel code of OSPU, the serial number of OSPU is displayed out by system and for user autonomic use, and kernel code of the OSPU is not displayed out by system and not known to user, the kernel code of OSPU is for identification purpose within system;
   the kernel code and the serial number of OSPU are indivisible, as long as one thereof does not match the FOS server record, the OSPU with these codes will be rejected by the FOS server;
   the kernel code of the OSPU and the serial number of the OSPU are in monitoring scope of the OSPU monitoring program embedded in a nonvolatile storage medium of the OSPU, illegal editing of them leads to loss of function of the OSPU.

18. The FOS computer of claim 15, wherein the user login is a process comprising:
   power-up the FOS Computer;
   initializing the OSPU by operation of the BIOS stored in a nonvolatile storage medium at the fat client;
   the OSPU loads the FOS by first loading boot loader of the FOS in the OSPU;
   the OSPU loads the base portion of FOS from OSPU to the RAM at the fat client;
   using the OSPU to enable a connection between the fat client and the FOS Server;
   the OSPU downloads the extended portion of the FOS from FOS Server and stores the downloaded extended portion of the FOS to the RAM;
   in RAM, the base portion of FOS is integrated with the extended portion of FOS;
   one of the user accounts is selected;
   user inputted credential data is collected;
   the OSPU programs a serial number of the OSPU and a kernel code of the OSPU in the handling of the credential data;
   the OSPU sends the programmed credential data with the serial number of the OSPU and the kernel code of the OSPU to the FOS Server;
   the FOS Server identifies the identity of the requester by confirming the serial number of the OSPU and the kernel code of the OSPU programmed in the handling of the received credential data with the serial number of the OSPU and the kernel code of the OSPU recorded on FOS Server;
   the FOS Server confirms the user inputted credential data with the user login data recorded on FOS Server;
   the FOS Server confirms the user inputted credential data with the associated serial number of the OSPU and kernel code of the OSPU recorded on FOS Server.

19. The FOS computer of claim 15, wherein the transferring data identification is a process comprising:
   power-up the FOS Computer;
   initializing the OSPU by operation of the BIOS stored in a nonvolatile storage medium at the fat client;
   the OSPU loads the FOS by first loading boot loader of the FOS in the OSPU;
   the OSPU loads the base portion of the FOS from the OSPU to the RAM at the fat client;
   using the OSPU to enable a connection between the fat client and the FOS Server;
   the OSPU downloads the extended portion of the FOS from the FOS Server, and stores the downloaded extended portion of the FOS to the RAM;
   in RAM, the base portion of FOS is integrated with the extended portion of FOS;
   a data is generated by operation of the FOS;
   the OSPU programs a serial number of the OSPU and a kernel code of the OSPU in the handling of the data;
   the OSPU sends the programmed data to the FOS Server;
   the FOS Server confirms the serial number of the OSPU and the kernel code of the OSPU programmed in the handling of the received data according to the serial number of the OSPU and kernel code of the OSPU recorded on the FOS Server;
   the FOS Server confirms the serial number of the OSPU and the kernel code of the OSPU associated with the user account;
   the FOS Server stores the received data into the user account associated with the received serial number of OSPU and kernel code of OSPU.

20. The FOS computer of claim 1, wherein the OSPU is a system in package (SiP), a serial number of the OSPU and a kernel code of the OSPU are used in the data conversion or validation process in the data processing system of the OSPU.

21. The FOS computer of claim 1, wherein the FOS allows an operating system to operate on different computer architectures by performing steps comprising of:
   power-up the FOS Computer;
   initializing the OSPU by operation of the BIOS;
   loading the base portion of the FOS to the RAM by first loading boot loader of the FOS in the OSPU;
   using the OSPU to enable a connection between the fat client and the FOS server having the extended portion of FOS;
   the OSPU collects computer architecture information of the fat client from operation of the BIOS and a user input;
   the OSPU sends the computer architecture information of the fat client to the FOS Server;
   the FOS Server selects suitable system file of the extended portion of FOS according to the computer architecture information received from the OSPU;
   the OSPU downloads the selected extended portion of the FOS from the FOS Server, and stores the downloaded extended portion of FOS to the RAM;
   in RAM, the base portion of FOS is integrated with the extended portion of FOS.

22. The FOS computer of claim 1, wherein converting the data generated by operation of the FOS to another format is a process comprising:
power-up the FOS Computer;
initializing the OSPU by operation of the BIOS stored in a nonvolatile storage medium at the fat client;
the OSPU loads the FOS by first loading boot loader of the FOS in the OSPU;
the OSPU loads the base portion of FOS from OSPU to the RAM at the fat client;
using the OSPU to enable a connection between the fat client and the FOS Server;
the OSPU downloads the extended portion of the FOS from the FOS Server to the RAM at the fat client;
a data is generated by operation of the FOS;
the OSPU programs a serial number of the OSPU and a kernel code of the OSPU in the handling of the data generated by operation of the FOS to a format only can be handled by the OSPU and the FOS Server.

23. The FOS computer of claim 1, wherein validating the data generated by operation of the FOS is a process comprising:
power-up the FOS Computer;
initializing OSPU by operation of the BIOS stored in a nonvolatile storage medium on the fat client;
load the FOS by first loading boot loader of FOS in the OSPU;
load the base portion of the FOS from the OSPU to the RAM at the fat client;
using the OSPU to enable a connection between the fat client and the FOS Server;
the OSPU downloads the extended portion of FOS from the FOS Server to the RAM at the fat client;
a data is generated by operation of the FOS;
the OSPU programs a serial number of the OSPU and a kernel code of the OSPU in the handling of the data generated by operation of the FOS;
the OSPU sends the data having the serial number of the OSPU and the kernel code of the OSPU in the handling to the FOS Server;
the FOS Server validates the data by confirming the serial number of the OSPU and the kernel code of the OSPU programmed in the handling of the received data according to the associated serial number of the OSPU and kernel code of the OSPU recorded on FOS Server.

24. The FOS computer of claim 1, wherein guiding the integration of FOS is a process comprising:
power-up the FOS Computer;
initializing OSPU by operation of the BIOS stored in a nonvolatile storage medium on the fat client;
loading the base portion of the FOS to the RAM by first loading boot loader of FOS in the OSPU;
using the OSPU to enable a connection between the fat client and the FOS Server;
the OSPU downloads the extended portion of FOS from FOS Server, and stores the downloaded extended portion of FOS to the RAM;
in RAM, the base portion of FOS is integrated with the extended portion of FOS.

25. The FOS computer of claim 1, wherein the initializing OSPU by operation of the BIOS is a process comprising:
power-up FOS Computer;
displaying a serial number of the OSPU in a boot menu programmed to display serial number of all bootable device in FOS Computer;
a user selection and confirmation of FOS Computer the user desired OSPU is entered by using the boot menu;
initializing the user desired OSPU by operation of the BIOS stored in a nonvolatile storage medium on the fat client.

* * * * *